United States Patent [19]

Clasen

[11] Patent Number: 4,695,305
[45] Date of Patent: Sep. 22, 1987

[54] METHOD OF FOR MANUFACTURING GLASS BODIES

[75] Inventor: Rolf Clasen, Aachen, Fed. Rep. of Germany

[73] Assignee: U.S. Philips Corporation, New York, N.Y.

[21] Appl. No.: 835,407

[22] Filed: Mar. 3, 1986

[30] Foreign Application Priority Data

Mar. 29, 1985 [DE] Fed. Rep. of Germany ....... 3511454

[51] Int. Cl.⁴ .................... C03B 37/023; C03C 4/00
[52] U.S. Cl. ........................................ 65/18.3; 65/2; 65/3.11; 65/3.12; 65/DIG. 16; 65/901; 65/17; 156/DIG. 108; 264/23; 501/12
[58] Field of Search ................... 65/2, 3.11, 3.12, 17, 65/18.1, 18.3, 18.4, DIG. 16; 501/12; 156/DIG. 108; 264/23

[56] References Cited

U.S. PATENT DOCUMENTS

| 3,038,199 | 6/1962 | Bartow et al. | 264/104 X |
| 4,417,910 | 11/1983 | Passaret | 65/18.4 X |
| 4,419,115 | 12/1983 | Johnson et al. | 65/3.12 |
| 4,574,063 | 3/1986 | Scherer | 501/12 X |

FOREIGN PATENT DOCUMENTS

| 59-131538 | 7/1984 | Japan | 65/18.1 |
| 59-152235 | 8/1984 | Japan | 65/2 |
| 60-54928 | 3/1985 | Japan | 65/17 |

Primary Examiner—Robert L. Lindsay
Attorney, Agent, or Firm—Norman N. Spain

[57] ABSTRACT

A method of and arrangements for manufacturing glass bodies, in which method a thixotropic suspension, being the starting material for the glass body, is used to form a porous green body which is subsequently subjected to a purification step in a heated gaseous phase and then sintered to form a glass body, the starting material being homogenized and liquefied in a closed elastic mould by subjecting it to sound or ultrasonic, after which the liquid starting material is given the shape of the glass body to be formed and then solidified.

13 Claims, 1 Drawing Figure

U.S. Patent    Sep. 22, 1987    4,695,305
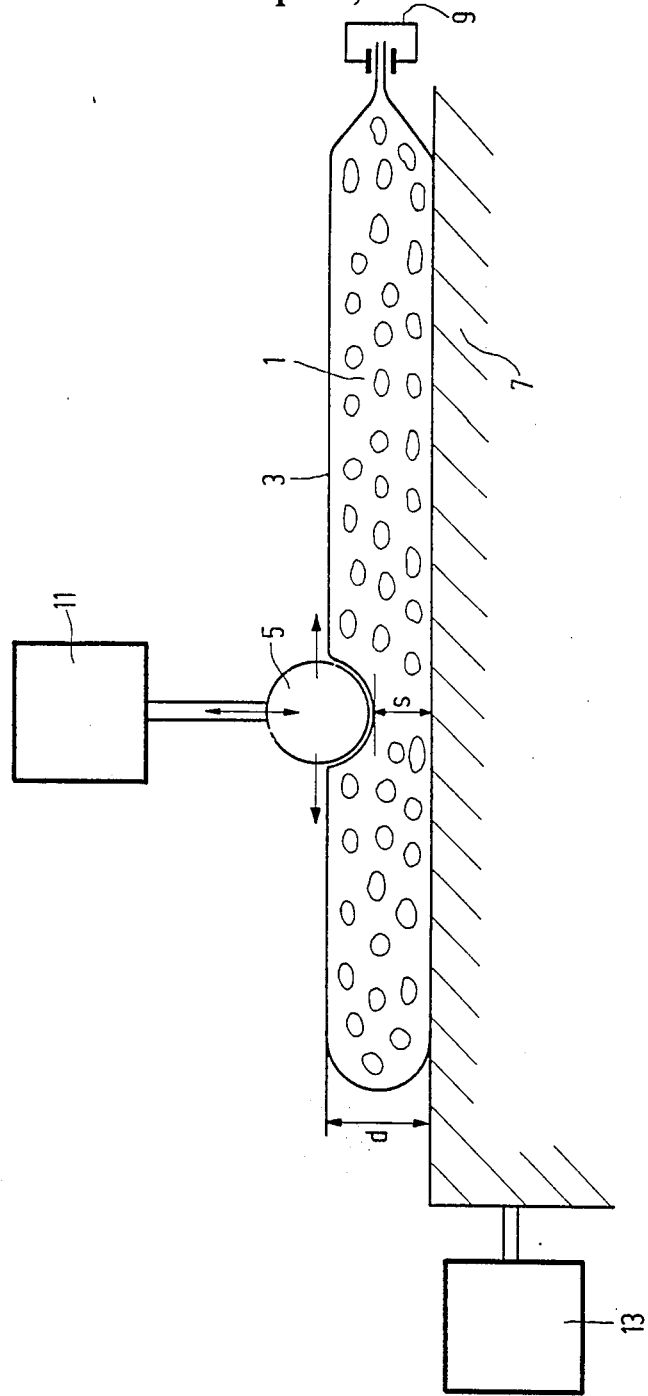

METHOD OF FOR MANUFACTURING GLASS BODIES

BACKGROUND OF THE INVENTION

The invention relates to a method of manufacturing glass bodies, in which method a thixotropic suspension, the starting material for the glass body, is used to form a porous green body which is subsequently subjected to a purification step in a heated gaseous phase and then sintered to form a glass body.

The invention further relates to arrangements for carrying out such a method as well as to the use of the glass bodies manufactured by the method in accordance with the invention.

The method mentioned in the opening paragraph is particularly suitable for the manufacture of preforms for optical waveguides.

In order to homogenize very viscous moulding materials which can be formed without previous dehydration prior to the moulding process, use is made in the art of ceramics, dependent upon the viscosity, of roller mills ($\eta \approx 10^3$ Pa·s), kneading machines ($\eta \approx 10^4$ Pa·s) or extruders ($\eta \approx 10^5 \ldots 10^6$ Pa·s).

Using mixers which are known in the art to mix and homogenize the aqueous, very viscous moulding materials containing quartz-glass particles is disadvantageous because the rollers, kneading blades, or barrel extruders are mostly made of steel alloys. The hardness of the quartz-glass powder (Mohs' scale of hardness: quartz $\approx 7$, steel $\approx 5$) inevitably leads to abrasion, and as the kneading times increase to a considerable amount of impurities in the moulding material caused by the presence of iron, chromium, nickel etc. which are difficult to remove or at least substantially increase the cost of purifying the green bodies formed from the moulding material. These impurities are particularly disadvantageous in the case of sintering of green bodies to form quartz-glass tubes or quartz-glass rods as cladding material or core material for optical waveguides, because small concentrations in the ppb-range already adversely affect the transmission properties of optical waveguides.

An additional disadvantage of the use of kneading devices and extruders is that each time only a small part of the moulding material to be processed is sheared. As highly concentrated aqueous substances of microdispersed quartz-glass particles exhibit an extremely high degree of thixotropy in comparison with other known ceramic substances, the viscosity of the substance is lower only in the sheared areas which, consequently, are the only locations where the substance is thoroughly mixed. In order to obtain homogeneous substances, the substance to be processed must be removed from the dead angles and pressed into the shearing zone, which operation entails additional costs.

In kneading using a three-roll mill, each volume element is sheared equally (if it is at all drawn in by the rolls), yet, the substances which are milled to form a thin film quickly lose humidity and, thus, change their composition and viscosity if no additional action is undertaken to counteract these unwanted effects.

Consequently, the known methods of processing very viscous ceramic substances have the disadvantage of being very time-consuming, and besides they necessitate lengthy purification processes when very pure quartz-glass bodies, such as for the manufacture of optical waveguides, are to be formed.

BRIEF SUMMARY OF THE INVENTION

It is an object of the invention to provide a method of and arrangements for producing a substance which is homogeneous as to composition and rheological properties and by means of which a very pure glass body can be obtained, while avoiding the introduction of impurities from processing arrangements into the substance.

This object is achieved by a method in accordance with the invention, in which the starting material is homogenized and liquefied in a closed elastic mould by subjecting it to mechanical forces, and subsequently freeing it of the influence of the these forces, after which the starting material solidifies again to form a green body.

Arrangements for carrying out the method in accordance with the invention, are characterized by 1. a fixedly positioned supporting table and at least one vibratory roller which operates in the sound range (20–200 Hz) and which has a no-load excursion up to the diameter of an elastic mould which is arranged between the supporting table and the vibratory roller(s) and which holds starting material which is to be homogenized and liquefied, the vibratory roller(s) being resiliently loaded with a pressure p-of 1 to $5 \cdot 10^5$ Pa, such that it (they) can be moved to and fro over the mould in a horizontal direction, or, 2. a fixedly positioned supporting table and at least one vibratory roller which operates in the ultrasonic range (20 to 50 kHz) and which has a vibration amplitude up to 100 $\mu$m, which vibratory roller(s) is (are) resiliently loaded with a pressure p of 1 to $5 \cdot 10^5$ Pa, such that it (they) can be moved to and fro over an elastic mould in a horizontal direction, which mould holds starting material which is to be homogenized and liquefied, and is arranged between the supporting table and the vibratory roller(s).

BRIEF DESCRIPTION OF THE DRAWING

In the drawing the sole FIGURE is a cross-section of an arrangement for carrying out the method of the invention.

DETAILED DESCRIPTION OF THE INVENTION

In accordance with an advantageous modified embodiment of the method in accordance with the invention, a closed rubber elastic mould is used in which the starting material is homogenized and liquefied by establishing a pressure contact between the mould and a vibratory roller which is moved over the closed mould, such that after deactivating the vibratory roller the liquefied starting material solidifies again due to the thixotropy effect to form a green body which after removal from the mould is subjected to a purification step in a heated gaseous phase, after which it is sintered to form a glass body. This has the advantage that it is also possible to efficiently homogenize very viscous starting materials for the manufacture of a glass body, introduction of impurities into the starting material by processing devices being prevented by the use of an intermediate mould in the form of a hose.

In working up materials for the manufacture of types of glass, for example, for optical waveguides, the highest possible standard of cleanliness is a prerequisite; consequently, the manufacturing methods generally known in the art of glass or ceramics are no longer practicable. By means of the present method it becomes possible to encapsulate materials for the manufacture of very pure types of glass, particularly, for optical waveguides and to process the encapsulated materials up to the stage of dried green bodies. Thus, the materials are protected from detrimental ambient influences, such as atmospheric influences, impurities stemming from the arrangements used or even evaporation losses.

In accordance with further advantageous modified embodiments of the invention, a suspension is used as the starting material for the glass body, which comprises $SiO_2$ particles having a diameter in the range from 10 to 500 nm in, preferably between 15 and 100 nm, an aqueous suspension having a weight ratio between solid matter and water from 1:1 to 2.4:1, preferably from 1.4:1 to 2:1 being used. Plus suspension advantageously comprises an ionogenic additive in an amount between 0.2 and 2.0% by weight of the solids content of the suspension, which additive causes the pH-value of the suspension to lie within the range $pH \approx 5.5-8$. The invention is based on the recognition that a very high thixotropy effect is obtained with aqueous suspensions of submicroscopic $SiO_2$ (particles having a diameter between 10 and 500 nm) by adding between 0.2 and 2.0% by weight (of the solids content of the suspension) of a basically reacting ionogenic substance which causes the pH-value of the suspensions to lie within the pH range $\approx 5.5-8$, which thixotropy effect may be used to very efficiently homogenize, compact and simultaneously deform the liquid-state starting material for the glass body to be produced. In accordance with a further recognition of the invention, these process steps can be very efficiently carried out in an elastic, closed mould, the advantage being that the production process meets the highest possible standards of cleanliness with a relatively low investment in equipment.

In accordance with further advantageous embodiments of the method in accordance with the invention, an ammonium compound, preferably $NH_4F$ in an aqueous solution, is used as the ionogenic additive. As ammonium compounds are very volatile and can be fully removed from the green body in a subsequent purifying-heating step, quartz-glass bodies of very high purity can be produced. Due to the addition of ammonium compounds, green bodies having a relatively great strength are obtained because these compounds promote cross-linking, gellation taking place at the contact areas of two of the $SiO_2$ primary particles. At a suspension temperature of, for example, 20° C. and a pH-value $\leq 10$, $SiO_2$ dissolves at a rate of 100 ppm and is deposited at the contact areas, such that a bridging layer is formed.

By adding $NH_4F$, a fluorine doping can be obtained which is suitable for, for example, the manufacture of cladding glasses for optical waveguides.

In accordance with a further advantageous embodiment of the method in accordance with the invention, the starting material is homogenized using a vibratory roller which operates in the sound range (50 Hz) or ultrasonic range (35 kHz), and which has a no-load excursion up to the diameter of the mould, and which is resiliently loaded with a pressure p of 1 to $5 \cdot 10^5$ Pa; consequently, the starting material is liquefied and homogenized by the application of a sound field or ultrasonic field In the case of thixotropic systems, any kind of mechanical operation, for example, stirring or shaking included, will lead to a gel to sol conversion; however, if a sound vibrator or an ultrasonic vibrator is used whose amplitude is such that a sound field or ultrasonic field is applied to the starting material to be homogenized and liquefied, the cavities in the starting material are removed in a very effective way (gases are set free) and, thus, a very high density of the starting material is obtained. By opening the elastic mould, the gases set free can be removed from the starting material during the rolling-homogenizing process.

An example of an embodiment of the invention will now be described with reference to the sole FIGURE of the accompanying drawing.

A very viscous, aqueous suspension is produced as the starting material for the manufacture of a glass body; for this purpose, 150 g of commercially available microdispersed $SiO_2$ having an average particle diameter of 40 nm are mixed with 85 ml of water and 15 ml of (5%) aqueous $NH_4F$. A starting material 1 thus obtained which is crumbly and partially thoroughly moistened is introduced into a thin-walled, preferably, natural rubber, elastic hose 3 having a wall thickness of 0.8 mm, a diameter of 30 mm and a length of 160 mm, in such a manner that the hose is considerably dilated, yet without exceeding in any operating condition the maximum permissible tensile strength. Subsequently, the hose is closed. A vibratory roller 5 which operates at a frequency of f=50 Hz is used to liquefy, mix and homogenize the starting material 1. The vibratory roller 5 has a no-load excursion of 28 mm, is resiliently loaded with a pressure $p=1 \cdot 10^5$ Pa and is moved to and fro over the elastic hose 3 in a horizontal direction at a speed of 30 cm/min for 15 min. As the starting material 1 in the hose 3 becomes more intimately mixed and more homogenized, the distance s between the vibratory roller and a supporting table 7 on which the hose 3 is arranged decreases, due to the gradual liquefact-ion of the starting material 1, until a minimum distance is attained which is determined by the excursion of the vibratory roller 5. As the sound vibrations of the vibratory roller 5 can act suitably on the starting material 1 in the elastic hose 3 and the starting material 1 is pressed together by the dilated hose 3, large parts of the starting material 1 are sheared and, thus, the starting material 1 attains the lowest possible viscosity. The hose 3 also precludes contamination by metallic particles and loss of moistness. Air which is released from the starting material 1 during the rolling operation can be removed in an advanced stage of homogenization by opening a closing member 9 of the hose 3.

The use of additional rollers or the application of ultrasonic waves via the supporting table, for example via an ultrasonic or sound generator 13, either simultaneously or alternately with the operation of the cylindrical vibrator 5, may help raise the efficiency and reduce the time necessary to obtain a suitably homogenized starting material.

Instead of a vibratory roller which operates in the sound range, a vibratory roller may be used which operates in the ultrasonic range (20 to 50 kHz). In both cases, the vibrator 5 is operated via an ultrasonic or sound generator 11. The no-load excursion of a vibrator operating in the ultrasonic range is smaller than that of a vibrator operating in the sound range, however, this is suitably balanced by a controlled reduction of the distance s. A vibration amplitude up to 100 $\mu m$ is typical of rollers operating in the ultrasonic range where the rollers must also be resiliently loaded with a pressure in the order of 1 to $5 \cdot 10^5$ Pa. The other process parameters are as described hereinbefore with respect to a cylindrical vibrator working in the sound range.

After completing the first homogenization phase, the hose 3 containing the now relatively liquid starting material 1 is subjected to a second homogenization phase in which it is immersed in a vertical position in an ultrasonic bath for 10 min, such that air bubbles enclosed in the starting material 1 rise to the surface and can be removed by opening the closing member 9. The starting material which is liquefied by the application of sound vibrations or ultrasonic vibrations, solidifies again due to the thixotropy effect when the sound field or ultrasonic field is deactivated.

For removing the homogenized starting material from the mould, a procedure may be adopted which consists in introducing the liquefied starting material together with the elastic mould into another mould whose shape corresponds to that of the glass body to be formed, in which mould the said starting material solidifies in a deformed state, after which the elastic mould of the solidified starting material in the form of a green body can be peeled off.

In accordance with an alternative method, the homogenized starting material is left to solidify without the use of an additional mould, after which it is treated as described hereinbefore.

In order to remove OH-ions and impurities in the form of transition metals, the shaped and dried green body is subjected for one or more hours to a streaming oxygen atmosphere containing 6% by volume of chlorine gas at a temperature in the range from 600° to 900° C. Thus, the initial OH-value of about 200 ppm can be reduced to <10 ppb. Subsequently, the green body is sintered to form transparent glass in a helium atmosphere containing 2% by volume of chlorine gas at a temperature of 1500° C., in which process the green body is led through an oven at a speed of 3 mm/min. A quartz-glass body thus formed has a density of 2.20 g/cm$^3$, a refractive index $n_D$ of 1.4592 and is free from bubbles and reams.

A preform from which optical waveguides can be drawn having a step refractive index profile may be obtained by doping the green body and sealing it in a doped tube and/or undoped cladding-glass tube. It is also possible to produce an optical waveguide having a W-shaped refractive index profile by using in addition an intermediate tube having a lower refractive index obtained by suitable doping.

What is claimed is:

1. In a method of manufacturing glass bodies, in which method a thixotropic suspension, the starting material for the glass body, is used to form a porous green body which is subsequently subjected to a purification step in a heated gaseous phase and then sintered to form a glass body, the improvement wherein the starting material is placed in an elastic mold, is subjected to mechanical forces applied to the external surface of said elastic mold while in the elastic mold whereby it is homogenized and liquefied in the elastic mould and is subsequently freed of the influence of said mechanical forces, as a result of which the starting material solidifies again to form a green body.

2. The method of claim 1 wherein the thixotropic suspension is placed in a rubber mold, a vibrating roller is moved over the mold in a manner such as to provide a pressure control with said mold thereby to homogenize and liquify said thixotropic suspension, the roller is removed from the mold thereby converting the suspension to a solid green body, said green body is removed from the mold is purified in a heated gaseous atmosphere and is then sintered to form a glass body.

3. The method of claim 1 wherein the liquified starting material while still in said elastic mold is introduced into another mold, the shape of which mold corresponds to that of the glass body to be formed, the liquified starting material is thixotropically solidified, the resultant solid green body corresponding to the shape of said other mold is removed from both of said molds, is subjected to said purification step and is sintered.

4. A method as claimed in claim 1, characterized in that the liquefied starting material solidifies in the elastic mould due to the thixotropy effect, after which it is removed from the mould and subjected to the remaining production steps.

5. A method as claimed in claim 1, wherein a suspension is used as the starting material for the glass body, which comprises SiO$_2$ particles having a diameter in the range from 10 to 500 nm, with an average particle diameter of 40 nm.

6. A method as claimed in claim 1, wherein an aqueous suspension is used having a weight ratio between solid matter and water from 1:1 to 2.4:1.

7. The method of claim 1 wherein a sufficient quantity of a basic ionogenic additive is added to the suspension to provide the suspension with a pH of $\approx 5.5$-8.

8. A method as claimed in claim 7, wherein an ammonium compound is used as an ionogenic additive.

9. A method as claimed in claim 8, wherein NH$_4$F in an aqueous solution is used as an ionogenic additive.

10. A method as claimed in claim 7, wherein the ionogenic additive is added in an amount of from 0.2 to 2.0% by weight of the solids content of the suspension.

11. A method as claimed in claim 9, wherein an aqueous suspension is used as the starting material, which contains SiO$_2$ particles having an average diameter of 40 nm and a solid:water weight ratio of 1,5:1, a 5% aqueous NH$_4$F solution in an amount of 0.5% by weight of the solids content of the suspension being added as an ionogenic additive.

12. A method as claimed in claim 1, wherein the starting material is homogenized using a vibratory roller which operates in the sound range (50 Hz) or ultrasonic range (35 kHz), and which has a no-load excursion up to the diameter of the mould, and which is resiliently loaded with a pressure p of 1 to $5 \cdot 10^5$ Pa.

13. A method as claimed in claim 1, wherein a hose of natural rubber is used as an elastic mould.

* * * * *